United States Patent
Kahn

(10) Patent No.: US 7,106,383 B2
(45) Date of Patent: Sep. 12, 2006

(54) METHOD, SYSTEM, AND APPARATUS FOR CONFIGURING A SIGNAL PROCESSING DEVICE FOR USE WITH A DISPLAY DEVICE

(75) Inventor: Michael Kahn, Westampton, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 172 days.

(21) Appl. No.: 10/457,251

(22) Filed: Jun. 9, 2003

(65) Prior Publication Data
US 2005/0001931 A1    Jan. 6, 2005

(51) Int. Cl.
H04N 5/46    (2006.01)
(52) U.S. Cl. ............... 348/556; 348/555
(58) Field of Classification Search ........... 348/554, 348/555, 556, 558, 449; 345/699, 698; H04N 5/46
See application file for complete search history.

(56) References Cited

U.S. PATENT DOCUMENTS 5,587,744 A * 12/1996 Tanaka .................. 348/556
6,366,263 B1 * 4/2002 Takasu et al. ........... 345/13
6,839,903 B1 * 1/2005 Shintani et al. .......... 725/39
2002/0057281 A1 * 5/2002 Moroo et al. ........... 345/668

OTHER PUBLICATIONS

Video Electronics Standards Association; "Vesa Enhanced Extended Display Identification Data Standard"; Feb. 9, 2000; pp. 1-32.
Electronic Industries Alliance; "EIA Standard, A DTV Profile for Uncompressed High Speed Digital Interfaces"; EIA/CEA-861; Jan. 2001; pp. 1-30.

* cited by examiner

Primary Examiner—Michael H. Lee
(74) Attorney, Agent, or Firm—RatnerPrestia

(57) ABSTRACT

A method, system, and apparatus for configuring a signal processing device for use with a display device having a display size is disclosed. The signal processing device is configured by determining the display size of the display device and configuring the signal processing device for use with the display device based on the determined display size.

19 Claims, 3 Drawing Sheets

METHOD, SYSTEM, AND APPARATUS FOR CONFIGURING A SIGNAL PROCESSING DEVICE FOR USE WITH A DISPLAY DEVICE

FIELD OF THE INVENTION

The present invention relates to the field of television electronics and, more particularly, to methods, systems, and apparatus for displaying active image signals on a display device based on the display size of the display device.

BACKGROUND OF THE INVENTION

Television systems are presently available having standard display devices (e.g., monitors) sized to display 4×3 aspect ratio video images (referred to hereinafter as "standard" images) and widescreen display devices sized to display video images that are wider then the standard 4×3 aspect ratio (referred to herein as "widescreen" images). Presently, both standard images and widescreen images are publicly available. For example, the television industry commonly broadcasts television signals having a standard aspect ratio and the motion picture industry commonly distributes motion pictures having an aspect ratio of 16×9 or greater.

A signal processing device processes the video images for display by the display devices. Frequently, the signal processing device and the display device are separate components. In this type of system, to optimally display video images on the video display, the signal processing device must receive the aspect ratio of the video display. Presently, an operator manually supplies the aspect ratio to the signal processing device during a conventional set-up routine. If the supplied aspect ratio is incorrect, the signal processing device will be unable to tailor the video image to the particular video display on which it will be displayed. Thus, image quality may be degraded.

Several different formats are available for displaying a video image on a display device having a different aspect ratio than the video image. These formats include a letter/pillar box format and a full/zoom format. In a letter/pillar box format, inactive areas (e.g., black bars) surround the active video image. When displaying a widescreen image on a standard display, the black bars are present above and below the widescreen image (i.e., letterbox format). When displaying a standard image on a widescreen display, black bars are present on the left and right of the standard image (i.e., pillar box format).

In a full format, the active video image is stretched to fill the entire display device. Stretching the active video image causes distortion, e.g., circles appear as ovals. In a zoom format the active video image is enlarged to fill the entire display device. The enlarged active video image is then cropped to fit the display device.

Depending on the display size of the display device, different formats are needed to optimally view a video image having a different aspect ratio than the display device. For example, the letter/pillar box may be optimal for larger display devices, e.g., a display device having a diagonal size of 32 inches, since these display devices can produce an active image that is viewable comfortably without distortion or loss of any portion of the active image. On the other hand, the full/zoom format may be optimal on smaller display devices, e.g., a display device having a diagonal size of 13 inches, since an active image produced in letter/pillar box format may be too small for comfortable viewing. Presently, the viewer is required to select the display format. This is burdensome to the viewer and may result in the selection of a non-optimal format.

Accordingly, methods, systems, and apparatus are needed to optimally configure a signal processing device for use with a display device. The present invention fulfils this need among others.

SUMMARY OF THE INVENTION

The present invention is a method, system, and apparatus for configuring a signal processing device for use with a separate display device. The aforementioned needs are met by determining the size of the display device and configuring the signal processing device for use with the display device based on the determined size. By configuring the signal processing device based on the size of the display device, the signal processing device can be optimally configured for use with the display device.

The method for configuring a signal processing device for use with a display device includes determining the display size of the display device and configuring the signal processing device for use with the display device based on the determined display size. The method steps may be implemented in software as a computer readable medium that is configured to control a general purpose computer.

The system for configuring a signal processing device for use with a display device includes means for determining the display size of the display device and means for configuring the signal processing device for use with the display device based on the determined display size.

The apparatus includes a video processor, an interface, and a controller. The video processor processes an input signal for display on the display device. The interface receives display device information associated with the display device, which includes a display size. The controller is coupled to the video processor and the interface to determine the display size from the received display device information and configure the video processor responsive to the determined display size.

BRIEF DESCRIPTION OF THE DRAWINGS

The invention is best understood from the following detailed description when read in connection with the accompanying drawings, with like elements having the same reference numerals. Included in the drawings are the following features.

DETAILED DESCRIPTION OF THE INVENTION

Figure 1:
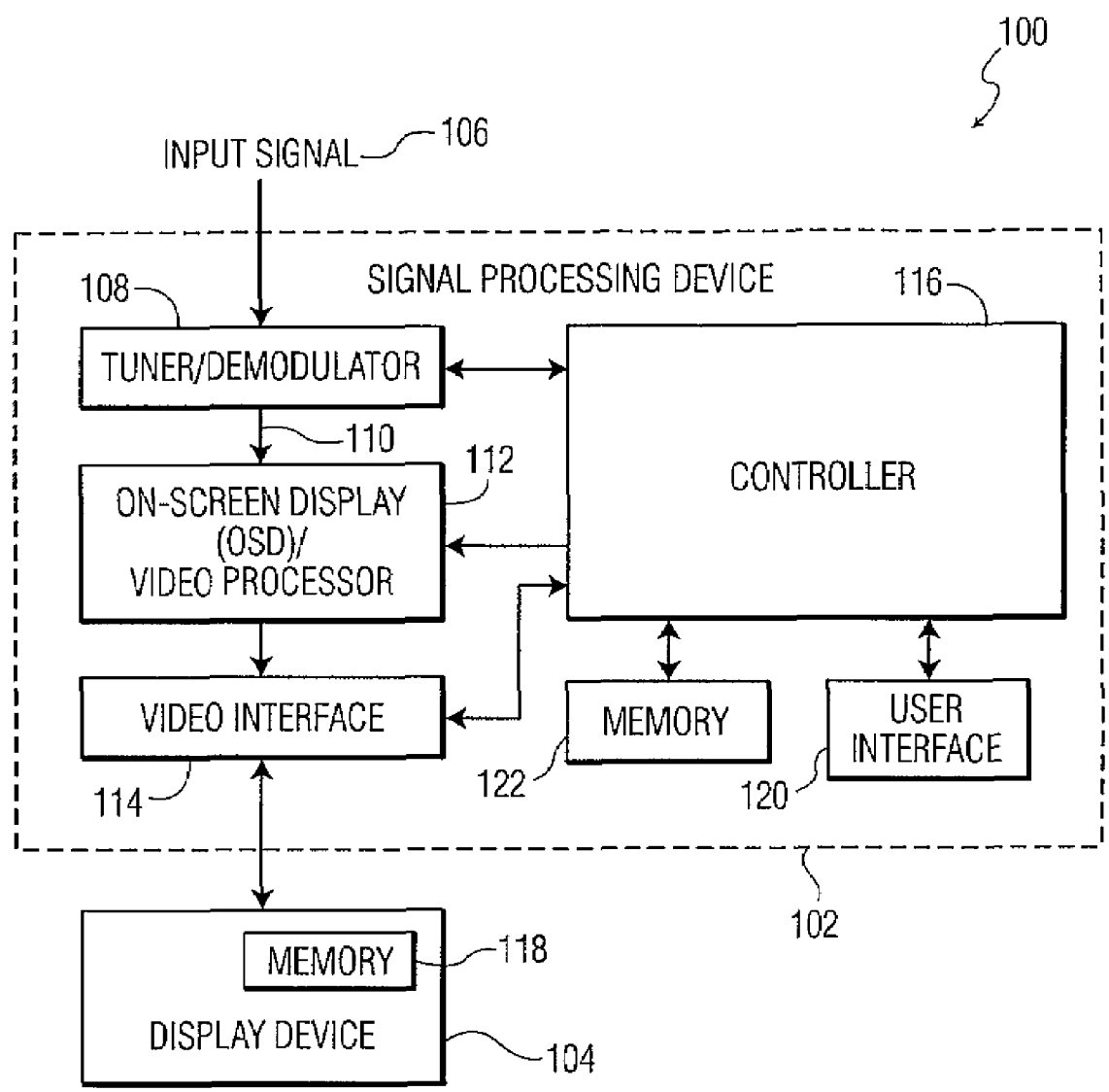
FIG. 1 is a block diagram of an exemplary signal processing device for use in accordance with the present invention.

FIG. 1 depicts an exemplary embodiment of a video system 100 in accordance with the present invention. The illustrated video system 100 includes a signal processing device 102 that is configurable for use with a display device 104 (e.g., a television monitor). In an exemplary embodiment, the signal processing device 102 and the display device 104 are separate components. In certain exemplary embodiments, the signal processing device 102 is implemented in an integrated receiver/decoder (IRD) contained within a set-top box (not shown), which may contain additional circuitry.

In the illustrated signal processing device 102, a digital or analog input signal 106 (e.g., a television signal) is applied to a tuner/demodulator 108. The tuner/demodulator 108 tunes and demodulates the input signal 106 to yield a demodulated input signal 110. The demodulated input signal 110 is provided to an on-screen display (OSD)/video processor 112, which processes the demodulated input signal 110 for display on the display device 104 via a video interface 114. The OSD/television signal processor 112 may be a conventional analog and/or digital television signal processing system, including circuits for decoding and processing both audio and video components, coupled to a conventional OSD processor.

The video interface 114 passes signals from the OSD/video processor 112 to the display device 104. In an exemplary embodiment, the signals are passed to the display device 104 using conventional video signal lines (e.g., Y, Cr, Cb video signal lines). In an alternative exemplary embodiment, the signals are passed via a digital video interface (DVI) such as a DVI in accordance with the DVI standard described in Digital Video Interface DVI, Revision 1.0, dated Apr. 2, 1999, provided by the Digital Display Working Group (DDWG) Promoters. In addition, the video interface 114 passes signals between a controller 116 and the display device 104. In an exemplary embodiment, the signals between the controller 116 and the display device 104 may pass on one of the conventional video signal lines (e.g., Y, Cr, or Cb) or DVI lines, or through a separate connection. If a separate connection is used, the video interface 114 may be removed from between the OSD/video processor 112 and the display device 104. In certain exemplary embodiments, the video interface 114 includes a wireless interface (not shown) for wireless communication with the display device 104.

The display device 104 displays the processed signals received from the OSD/video processor 112 via the video interface 114. The illustrated display device 104 includes a memory 118, which, in an exemplary embodiment, stores one or more display parameters associated with the display device 104. In an exemplary embodiment, the display parameters include a display size and a display aspect ratio. The display size corresponds to the physical dimensions of the display device used for displaying the demodulated input signal 110 (e.g., display height, display width, etc.) and may be stored in the memory 118. The aspect ratio may be stored in the memory 118 or derived from the stored display size parameters (e.g., display width×display height). In certain exemplary embodiments, the one or more display parameters include information associated with the display device 104 such as a model number or a serial number. In certain exemplary embodiments, the display device 104 conforms to the Enhanced Extended Display Identification Data (EDID) standard, Release A, Revision 1, dated Feb. 9, 2000, adopted by the Video Electronics Standards Association (VESA). In certain exemplary embodiments, the display device 104 includes a wireless interface (not shown) for wireless communication with the video interface 114.

A controller 116 controls the tuner/demodulator 108, the OSD/video processor 112, and the video interface 114. In an exemplary embodiment, the controller 116 determines the display size of the display device 104 and configures the OSD/video processor 112 to display the demodulated input signal 110 based on the determined display size. Thus, the controller 116 configures the signal processing device 102 based on the determined display size. In certain exemplary embodiments, the controller 116 further determines the aspect ratio of an active image within the input signal and the aspect ratio of the display device and further configures the OSD/video processor 112 to display the demodulated input signal 110 based on the determined aspect ratios. In an exemplary embodiment, the controller 116 is configured to query the memory 118 within the display device 104 through the video interface 114 to determine the display parameters of the display device 104. In an alternative exemplary embodiment, a user may enter one or more of the display parameters directly through the user interface 120. A suitable controller 116 for use in the present invention will be readily apparent to those of skill in the art of television signal processing.

Figure 2:
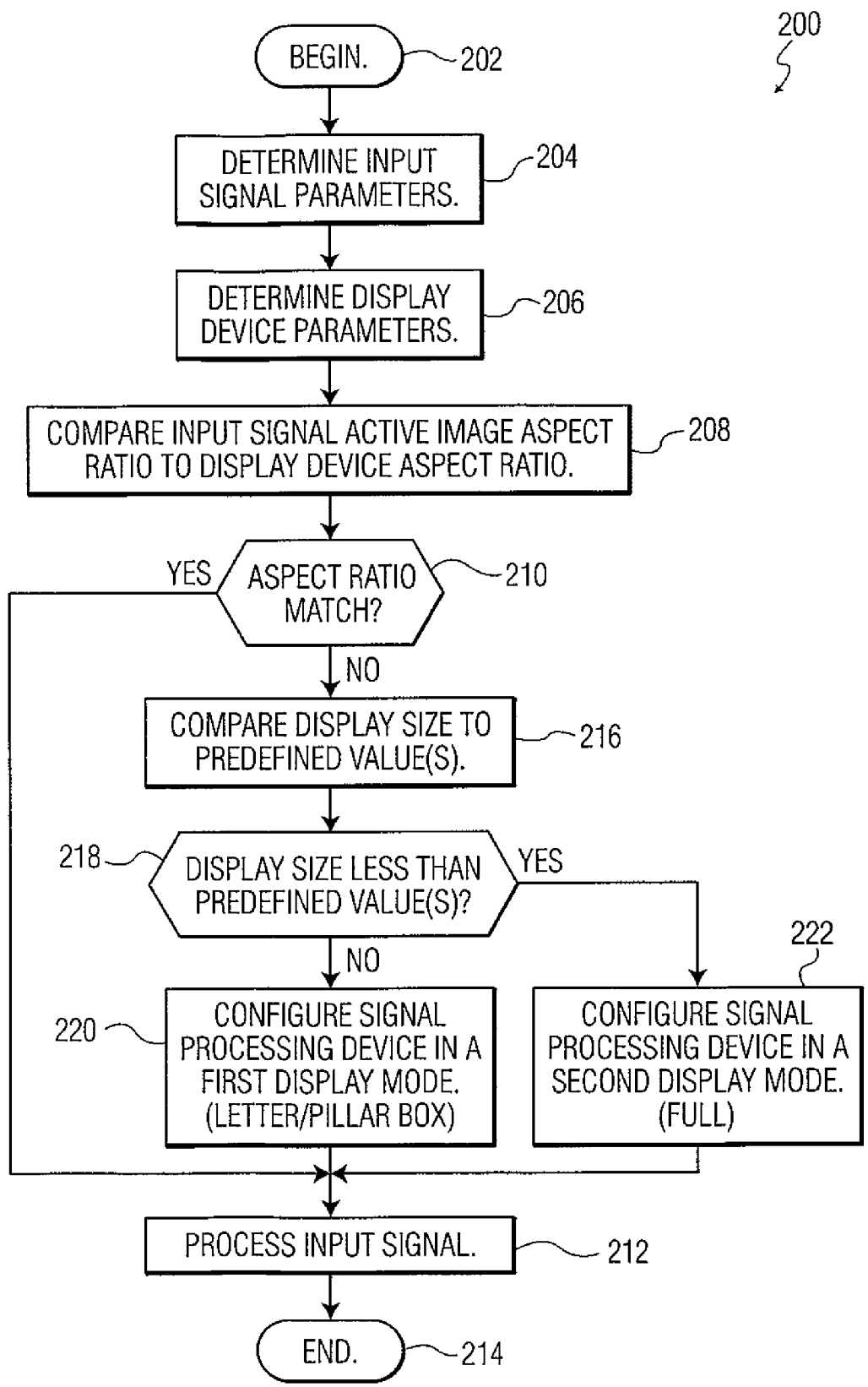
FIG. 2 is a flow chart of exemplary steps for configuring a signal processing device in accordance with the present invention.

FIG. 2 depicts a flow chart 200 of exemplary steps for configuring a signal processing device 102 (FIG. 1) for use with a display device 104 (FIG. 1) in accordance with the present invention. Processing begins at block 202 with the determination of input signal parameters at block 204. In an exemplary embodiment, the input signal parameters include the aspect ratio of an active image within the demodulated input signal 110 (FIG. 1). In certain exemplary embodiments, the signal processing device automatically determines the aspect ratio of the active image in a known manner by examining the demodulated input signal. In certain other exemplary embodiments, a user determines the active image aspect ratio by viewing an image on the display device. The user then provides the aspect ratio to the signal processing device through the user interface 120 (FIG. 1).

At block 206, display device parameters are determined. In an exemplary embodiment, the display device parameters include the aspect ratio and the display size of the display device 104 (FIG. 1). In an exemplary embodiment, the display size is expressed as a vertical dimension, a horizontal dimension, a diagonal dimension, a combination thereof, or in essentially any manner indicative of size. For example, the display size may be represented as a vertical dimension, e.g., a display height of 20 centimeters.

In certain exemplary embodiments, the signal processing device 102 (FIG. 1) determines the aspect ratio and/or the display size automatically through communication with the display device 104 (FIG. 1). In accordance with this embodiment, the signal processing device queries a memory 118 (FIG. 1) within the display device that stores the aspect ratio and/or the display size of the display device. In certain other exemplary embodiments, a user supplies the aspect ratio and/or the display size to the signal processing device through the user interface 120 (FIG. 1). In certain exemplary embodiments, the signal processing device 102 determines the aspect ratio by deriving it from other information stored in the display device or supplied by the user such as raster format, e.g., 1080I, 480I, 480P, or 720P.

In certain other exemplary embodiments, the signal processing device determines the aspect ratio and/or the display size by receiving from the display device or the user an indicator associated with the display device that is used to retrieve the aspect ratio and/or display size. For example, the indicator may be a model number or other such identifier associated with the display device that the signal processing device uses to obtain the appropriate aspect ratio or display size. In accordance with this example, the aspect ratio and display size may be associated with the model number and stored in an internal memory 122 (FIG. 1) or in an external database accessible through an Intranet/Internet.

At block 208, the aspect ratio of the active image within the input signal determined at block 204 and the aspect ratio of the display device determined at block 206 are compared. If the aspect ratios match, block 210 directs processing to block 212 where the demodulated input signal 110 (FIG. 1) is processed by the OSD/video processor 112 in a known manner for display in its entirety on the display device 104 (FIG. 1). Processing then ends at block 214. If the aspect ratios do not match, processing proceeds at block 216.

At block 216, the display size of the display device 104 (FIG. 1) is compared to one or more predefined values. In an exemplary embodiment, if the display size is greater than or equal to a predefined value, block 218 directs processing to block 220. Otherwise, processing proceeds at block 222. For example, if the predefined value is a vertical dimension of 20 centimeters, if the vertical dimension of the display size is greater than or equal to 20 centimeters, processing proceeds to block 220. On the other hand, if the vertical dimension of the display size is less than 20 centimeters, processing proceeds at block 222. In an alternative exemplary embodiment, if the display size is greater than or equal to a first predefined value, block 218 directs processing to block 220 and, if the display size is less than a second predefined value, block 218 directs processing to block 222. In certain exemplary embodiments, the first and second predefined values are the same value.

At block 220, for display sizes greater than or equal to the predefined value, the signal processing device 102 (FIG. 1) is configured in a first mode to display the active image of the demodulated input signal 110 (FIG. 1). In an exemplary embodiment, the first mode displays the active image in a letterbox or pillar box display format based on the determined aspect ratios of the active image and the display device. A letterbox display format is selected to display a widescreen active image in its entirety on a standard display with black bars above and below the active image. A pillar box display format is selected to display a standard active image in its entirety on a widescreen display with black bars on the rights and the left of the active image. Thus, both formats utilize less than the entire display device to display the active image.

At block 222, for display sizes less than the predefined value, the signal processing device is configured in a second mode to display the active image. In an exemplary embodiment, the second mode is a full or zoom display format. As described above, in a full format, the active video image is stretched to fill the entire display device and, in a zoom format, the active video image is enlarged to fill the entire display device. Thus, the entire display device is utilized for displaying the active image. Other formats, such as a non-linear stretched image format in which the sides of an image experience a greater amount of distortion than the center of the image, will be readily apparent to those skilled in the art.

It is contemplated that a user may select, e.g., via the user interface 120 (FIG. 1), which display format associated with the second mode is used to display the active image.

In certain exemplary embodiments, it is contemplated that more than two display modes may be utilized. For example, a letterbox/pillar box format may be used for display sizes above a first predefined value, a zoom format may be used for display sizes below the first predefined value and above a second predefined value, and a full format may be used for display sizes below the second predefined value. Various similar alternative embodiments will be readily apparent to those of skill in the art.

After the signal processing device 102 (FIG. 1) is configured in the first or second display modes, the demodulated input signal 110 (FIG. 1) is processed at block 212. In an exemplary embodiment, the demodulated input signal is processed by the OSD/video processor 112 for display in the format associated with the particular mode in which the signal processing device is configured for display on the display device 104 (FIG. 1). Processing then ends at block 214.

Figure 3A:
FIG. 3A is an illustration of a widescreen image for processing in accordance with the present invention.
Figure 3B:
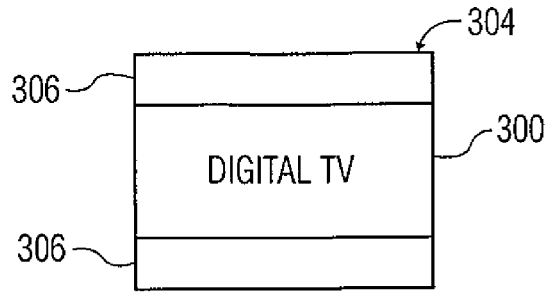
FIG. 3B is an illustration of the widescreen image of FIG. 3A produced in a letterbox format on a relatively large standard display device.
Figure 3C:
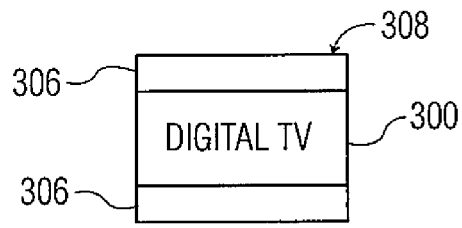
FIG. 3C is an illustration of the widescreen image of FIG. 3A produced in a letterbox format on a relatively small standard display device.
Figure 3D:
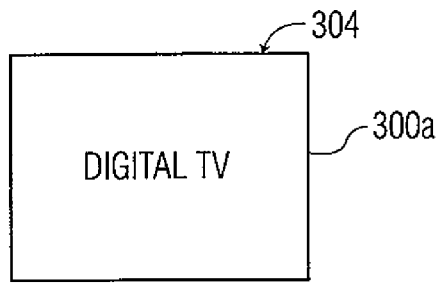
FIG. 3D is an illustration of the widescreen image of FIG. 3A produced in a zoom format on a relatively large standard display device.
Figure 3E:
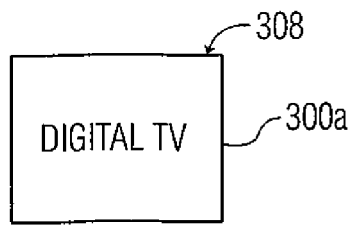
FIG. 3E is an illustration of the widescreen image of FIG. 3A produced in a zoom format on a relatively small standard display device.

An exemplary embodiment is now described with reference to FIGS. 3A-3E. FIG. 3A depicts an exemplary widescreen image 300 for processing by the signal processing device 102 (FIG. 1). The exemplary widescreen image 300 includes text 302 (i.e., "Digital TV") with an approximately equal amount of space on each side of the text 302. FIG. 3B depicts the exemplary widescreen image 300 displayed in a letterbox format on a relatively large standard display device 304, e.g., a diagonal display size of 20 inches or greater. The displayed image includes the entire active image 300 and black bars 306 above and below the active image 300. FIG. 3C depicts the exemplary widescreen image 300 displayed in a letterbox format on a relatively small standard display device 308, e.g., a diagonal display size of less than 20 inches. FIG. 3D depicts the exemplary widescreen image 300 displayed in a zoom format on the relatively large standard display device 304. The exemplary widescreen image 300 is enlarged and cropped such that the entire display device 304 is utilized to display a portion 300a of the exemplary widescreen image 300. FIG. 3E depicts the exemplary widescreen image 300 displayed in a zoom format on the relatively small standard display device 300.

Due to the relatively large size of the display device 304 depicted in FIGS. 3B and 3D, it is contemplated that the exemplary widescreen image 300 is comfortably viewable by most viewers in either the letterbox format or the zoom format. Since a portion of the widescreen image 300 is lost when zoomed, however, the optimal format for viewing the widescreen image 300 on the relatively large display device 304 is in the letterbox format. On the other hand, due to the relatively small size of the display device 308 depicted in FIGS. 3C and 3E, it is contemplated that the exemplary widescreen image 300 is too small for comfortable viewing in the letterbox format. Thus, the optimal format for viewing the widescreen image 300 on the relatively small display device 308 is in the zoom format. The selection of an optimal format for displaying a standard image on a widescreen display device will be readily apparent to those of skill in the art from the above discussion for displaying a widescreen image on a standard display device and, thus, is not described in further detail. Various optimal display formats for displaying active images on display devices having different display sizes will be readily apparent to those of skill in the art.

Referring back to FIG. 1, in certain exemplary embodiments, the display device 104 represents a plurality of display devices. In accordance with this embodiment, the controller 116 may configure the signal processing device 102 to process an input signal 106 for display on the display devices based on their respective display sizes. For example, the controller 116 may configure the signal processing device 102 to display an active image in a letter/pillar box format on a relatively large display device in the family room and in a full/zoom format on a relatively small display device in the kitchen. In certain exemplary embodiments, the signal processing device 102 is capable of configuring the input signal in multiple formats for display on multiple display devices simultaneously. In certain exemplary embodiments, the signal processing device 102 is capable of configuring the input signal in a format for display on one or more select ones of the plurality of display devices. The selected one or more display devices can be selected by a viewer or in another manner such as sensing a viewer in the proximity of one of the display devices.

Although the invention has been described in terms of configuring a signal processing device for displaying an image signal in different image display formats based on the display size of the display device, the signal processing device may be configured in other formats based on the display size. For example, the signal processing device may be configured to display text in a relatively larger size as compared to the active image for smaller display sizes and in a relatively smaller size as compared to the active image for larger display sizes. Thus, the text can be sized for comfortable viewing on a particular display device regardless of the display size of that device.

In addition, although the invention has been described in terms of a tuner/demodulator 108, an OSD display/video processor 112, video interface 114, and a controller 116 for configuring a signal processing device 102, it is contemplated that the invention may be implemented in software on a general purpose computer. In this embodiment, one or more of the functions of the various components may be implemented in software that controls the general purpose computer. This software may be embodied in a computer readable carrier, for example, a magnetic or optical disk, a memory-card or an audio frequency, radio-frequency or optical carrier wave.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for configuring a signal processing device for use with a display device having a display size and an aspect ratio, the signal processing device and the display device being separate devices, the method comprising the steps of:
    determining the display size of the display device;
    determining the aspect ratio of the display device;
    receiving a video signal;
    determining an aspect ratio of the received video signal; and
    configuring the signal processing device for use with the display device based on the determined display size and the determined aspect ratio to selectively display the received video signal: in a first mode that preserves the aspect ratio of the received video signal or in a second mode that displays the received video signal with the aspect ratio of the display device regardless of the aspect ratio of the received video signal.

2. The method of claim 1, wherein the display device provides the determined display size and the signal processing device is configured automatically responsive to the display size provided by the display device.

3. The method of claim 1, wherein the display device includes a register containing display information including the display size of the display device and the determining step comprises at least the step of:
    querying the register to determine the display size of the display device.

4. The method of claim 1, wherein the display device provides the determined display size and aspect ratio and the signal processing device is configured automatically responsive to the display size and aspect ratio provided by the display device.

5. The method of claim 1, wherein the signal processing device is configured in the first mode if the display size is at or above a first predefined value and in the second mode if the display size is below a second predefined value.

6. The method of claim 5, wherein the first mode displays the active image signal in a first format selected from a first group comprising a letterbox format and a pillar box format and the second mode displays the active image signal in a second format selected from a second group comprising a zoom format, a full format, and a nonlinear stretched format.

7. The method of claim 1, further comprising the steps of:
    determining a display size of an other display device; and
    further configuring the signal processing device for use with the other display device based on the determined display size of the other display device.

8. A method for configuring a signal processing device for use with a display device having an aspect ratio and a display size, the method comprising the steps of:
    determining the aspect ratio and the display size of the display device; and
    configuring the signal processing device for use with the display device based on the determined aspect ratio and display size, to selectively display a received video signal in a first mode that preserves the aspect ratio of the received video signal or in a second mode that displays the received video signal with the aspect ratio of the display device regardless of the aspect ratio of the received video signal.

9. The method of claim 8, wherein the display device provides the determined display size and aspect ratio and the signal processing device is configured automatically responsive to the display size and aspect ratio provided by the display device.

10. The method of claim 9, wherein the display device includes a register containing the display size and the aspect ratio of the display device and the determining step comprises at least the step of:
    querying the register to determine the display size and the aspect ratio of the display device.

11. The method of claim 8, wherein the first mode displays the active image signal on the display device in a first format selected from a first group comprising a letterbox format and a pillar box format and the second mode displays the active image signal on the display device in a second format selected from a second group comprising a zoom format, a full format, and a nonlinear stretched format.

12. A system for automatically configuring a signal processing device for use with a display device having a display size and an aspect ratio comprising:
    means for determining the display size of the display device;

means for determining the aspect ratio of the display device;

means for receiving a video signal;

means for determining an aspect ratio of the received video signal; and means for configuring the signal processing device for use with the display device based on the determined display size and the determined aspect ratio to selectively display the received video signal: in a first mode that preserves the aspect ratio of the received video signal or in a second mode that displays the received video signal with the aspect ratio of the display device regardless of the aspect ratio of the received video signal.

13. The system of claim 12, wherein the display device includes a register containing display information including the display size of the display device and the determining means includes:

means for querying the register to determine the display size of the display device.

14. The system of claim 12, wherein the signal processing device is configured in the first mode if the display size is at or above a first predefined value and in the second mode if the display size is below a second predefined value.

15. A television apparatus for automatically configuring a signal processing device for use with a display device, the apparatus comprising:

a video processor that receives an input signal, determines an aspect ratio for the input signal and processes an input signal for display on the display device;

an interface that receives display device information associated with the display device, the display device information including a display size and an aspect ratio; and a controller coupled to the video processor and the interface that determines the display size and the aspect ratio from the received display device information and configures the video processor responsive to the determined display size and the determined aspect ratio wherein, the controller selectively displays the received video signal: in a first mode that preserves the aspect ratio of the received video signal or in a second mode that displays the received video signal with the aspect ratio of the display device regardless of the aspect ratio of the received video signal.

16. The apparatus of claim 15, wherein the interface is a user interface. for receiving the display size manually from a user.

17. The apparatus of claim 15, wherein the interface is a video interface capable of interfacing with the display device to automatically determine the display size.

18. A computer readable medium including software that is configured to control a general purpose computer to implement a method for configuring a signal processing device for use with a display device having a display size and an aspect ratio, the signal processing device and the display device being separate devices, the method comprising the steps of:

determining the display size of the display device;

determining the aspect ratio of the display device;

receiving a video signal;

determining an aspect ratio of the received video signal; and configuring the signal processing device for use with the display device based on the determined display size and determined aspect ratio to selectively display the received video signal: in a first mode that preserves the aspect ratio of the received video signal or in a second mode that displays the received video signal with the aspect ratio of the display device regardless of the aspect ratio of the received video signal.

19. The computer readable medium of claim 18, wherein the display device includes a register containing display information including the display size of the display device and the determining step implemented in software comprises at least the step of:

querying the register to determine the display size of the display device.

* * * * *